UNITED STATES PATENT OFFICE.

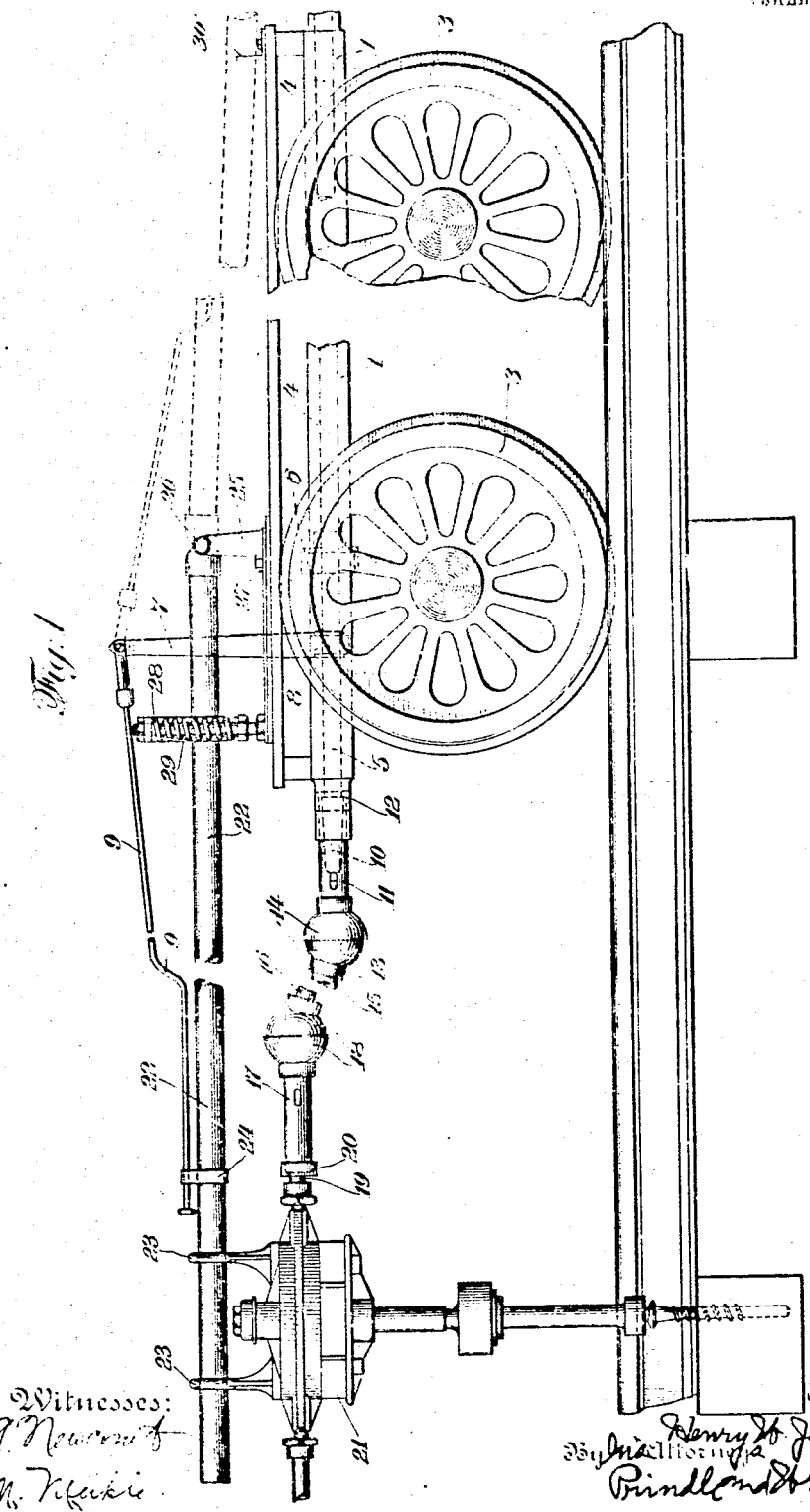

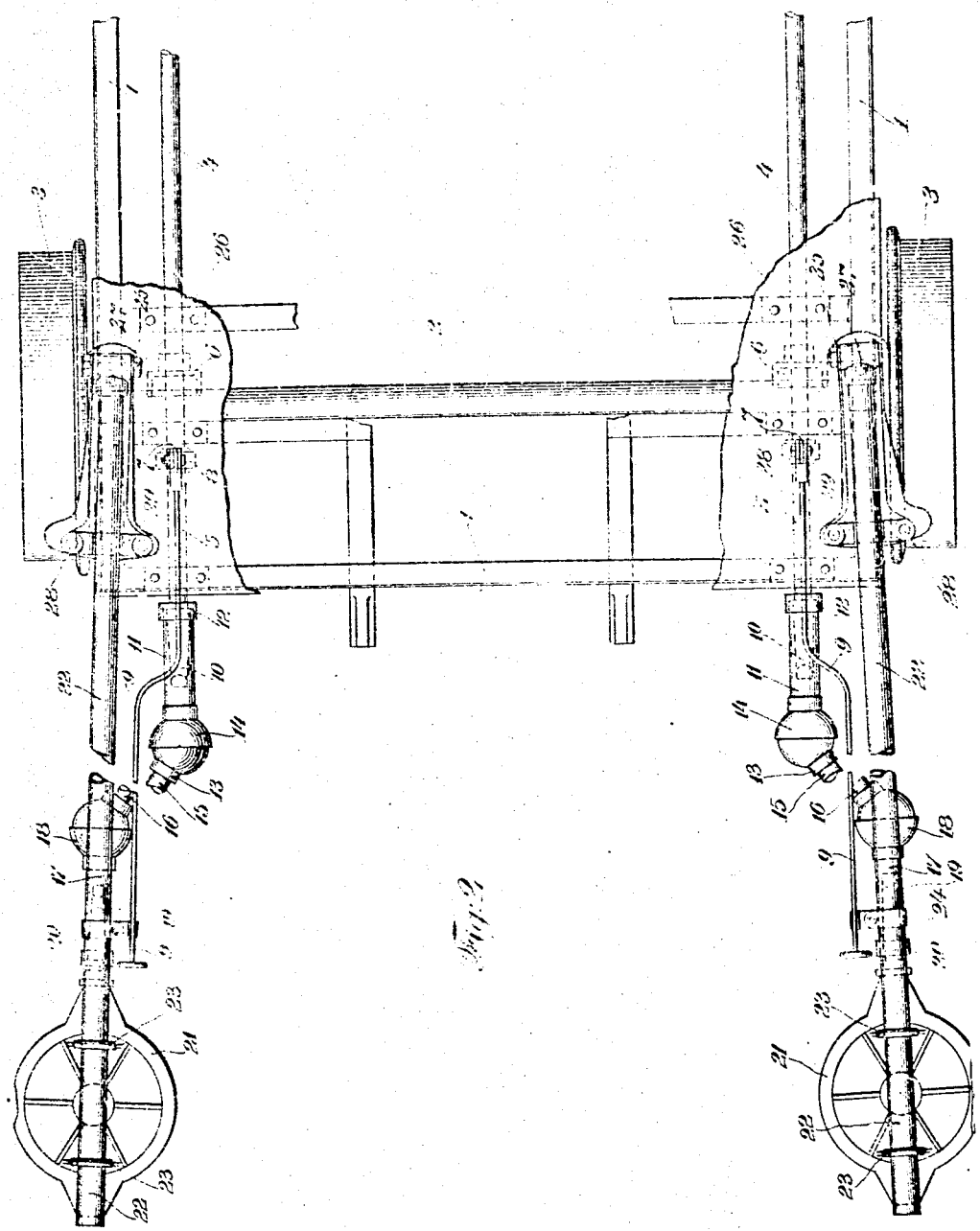

HENRY W. JACOBS, OF TOPEKA, KANSAS.

CRANE.

956,856.  Specification of Letters Patent.  Patented May 3, 1910.

Application filed November 23, 1908. Serial No. 464,050.

*To all whom it may concern:*

Be it known that I, HENRY W. JACOBS, of Topeka, in the county of Shawnee, and in the State of Kansas, have invented a certain new and useful Improvement in Cranes, and do hereby declare that the following is a full, clear, and exact description thereof.

My invention relates to an improvement in supporting cranes, and especially to cranes designed to be used upon movable vehicles for supporting tools of any desired type.

More specifically, the object of my invention is to provide a crane that is adapted for supporting and holding devices for driving screw-spikes in connection with track cars used in laying and repairing railroads.

I have shown one embodiment of my invention in the accompanying drawings, in which—

Figure 1 is a fragmental side view of a car equipped with my crane; and Fig. 2 is a similar plan view.

In the drawings 1 is a car body which is supported upon axles 2 and wheels 3 of the usual type. To the car body is attached a power shaft 4 which is designed to be thrown in and out of engagement with an extension 5 thereof, by means of a friction clutch 6 designed to be operated by means of a lever 7 connected to the extension 5 by a feather key and shifter 8 of the usual type. The lever 7 has connected thereto an operating rod 9, which extends beyond the front end of the car body. The longitudinal extension 5 has a taper shank 10 on its outer end, the purpose of which is to fit within a complementary taper socket 11 to which it can be removably attached by means of a ring 12. The taper socket 11 is connected at its other end by means of a universal joint with a telescoping shaft 13, the universal joint being covered by hemispherical shields 14. The telescoping shaft consists of a large outer member 15 and a smaller inner member 16, the latter being connected again to a universal joint, which latter conveys power to a taper socket 17, this universal joint being covered by hemispherical shields 18 in the same manner as described above. The taper socket 17 is constructed to receive a taper shank 19, to which it can be removably secured through the agency of a ring 20. The taper shank 19 conveys power direct to a screw driving tool 21, or tool of any other desired character. The tool 21 is retained upon a crane lever arm 22 by retaining brackets 23, of which there are 2. This crane lever arm 22 is provided near its center with a bracket 24 which constitutes a socket for holding the outer end of the rod 9 at its inner end. The crane lever arm 22 is supported upon a vertical stand 25, to which it is pivoted by means of a horizontal pinion 26. The stand 25 is pivoted upon a vertically located bolt 27 situated in the body of the car, so that the crane lever arms 22 can be rotated to any degree in a horizontal plane. The crane lever arm is further supported for yielding vertical movement through the agency of a pair of springs 28, one of which is situated on either side thereof. These two springs 28 are connected with each other by a saddle-bar 29 upon which the crane lever arm 22 is designed to rest. By the adjustment of the springs the vertical elevation of the crane lever arm can be readily changed and the tension of the springs regulated to suit any particular condition.

When the crane is designed to be thrown out of commission, the ring 12 can be removed and the taper socket 11 detached from the taper shank 10. When this has been accomplished the tool 21 can be removed from the outer end of the crane lever arm 22. The tool 21 and its attached shafts is thus detached from the rest of the mechanism and can now be placed upon the car body until required for further use. The crane lever arm is so constructed that it can now be folded backwardly upon its horizontal pivot 26 until it rests upon a support 30 located at the rear of the car.

The operation of the device is in general as follows:—During the operation of the tool, the lever 7 or the attached rod 9 has been operated so as to throw the friction gear 6 and to connect the longitudinal extension 5 with the power driven shaft 4. This results in causing the rotation of the screw-driving or other type of tool attached to the outwardly extending shafts. When it is desired to discontinue the operation of the tool 21, the lever 7 is operated either directly or indirectly so as to stop its rotation. The ring 12 is removed and the shafts disconnected at this point, and the tool is removed from the outer end of the crane lever arm 22. The detached tool and its attached shafts can now be placed upon the top of the car until it is necessary to use it again. Finally, the crane lever arm 22 is folded backwardly until it rests upon a support 30. In this position of the various parts the car is ready to be moved to another point for further operations, and when this point is reached the same steps are gone through in reverse order.

While I have described my invention above in detail, I wish it to be understood that I am not to be limited to the extent of the details therein, but consider that my invention is capable of many changes and different applications without departing from the spirit thereof.

I claim:

1. In a device of the character described, a movable support, a crane lever arm thereon, a power driven tool supported upon said arm, and a pivotal support for the arm upon the movable support to permit the arm to be folded backwardly on the movable support when not in use.

2. In a device of the character described, the combination of a crane lever arm, a power driven tool and a spring support to counterbalance the weight of the lever arm and tool.

3. In a device of the character described, the combination of a crane lever arm, a power driven tool supported by the end thereof, power connections for driving said tool and means supported by the crane lever arm for controlling the starting and stopping of said power connections.

4. In a device of the character described, the combination of a crane lever arm, a power driven tool supported by the end thereof, power connections for driving said tool, and a hand-operated lever supported by the crane lever arm for controlling the starting and stopping of said power connections.

5. In a device of the character described, a movable support, a crane lever arm attached thereto, a power-driven tool supported upon said lever arm, power-operating devices for said tool carried by said movable support, power connections for connecting the power-operating devices to said tool, and a hand-operated lever directly supported by the crane lever arm for controlling the starting and stopping of said power connections.

In testimony that I claim the foregoing I have hereunto set my hand.

HENRY W. JACOBS.

Witnesses:
ARTHUR WRIGHT,
M. MIRKLE.